Figure 1:
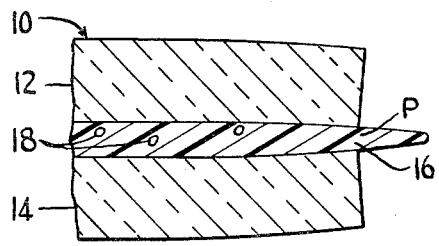

March 27, 1962 L. D. KESLAR 3,027,288

METHOD OF MANUFACTURING GLASS-PLASTIC LAMINATES

Original Filed April 22, 1954

INVENTOR.
LEROY D. KESLAR

BY Oscar L. Spencer
ATTORNEY

United States Patent Office 3,027,288
Patented Mar. 27, 1962

3,027,288
METHOD OF MANUFACTURING GLASS-PLASTIC LAMINATES
Leroy D. Keslar, Natrona Heights, Pa., assignor to Pittsburgh Plate Glass Company, Pittsburgh, Pa., a corporation of Pennsylvania
Continuation of application Ser. No. 424,852, Apr. 22, 1954. This application Nov. 23, 1960, Ser. No. 71,283
3 Claims. (Cl. 156—102)

The present invention relates to glass articles and their method of manufacture and is particularly concerned with improvements in laminating safety glass assemblies in an autoclave type of operation.

In the fabrication of laminated safety glass assemblies comprising a plurality of sheets of glass with an interlayer of plastic material interposed between adjacent glass sheets, the conventional procedure has been to assemble the laminate, partially seal the sheets together by preliminary pressing or spot sealing, and place the laminate so assembled within a bag of rubber or other similar flexible material, evacuate the bag, and place the assembly together with the evacuated bag in an autoclave where the glass is subjected to pressures up to 200 pounds per square inch and temperatures up to about 300° F. to complete the seal. After exposure to such temperature and pressure conditions, the bag containing the laminated assembly is removed from the autoclave and the laminated assembly removed from the bag ready for commercial use.

When the assemblies are pressed by such application of heat and pressure in an autoclave, there is a tendency for the plastic to flow from between the edges of the glass sheets and for the exterior sheets of glass to become bowed about their marginal portions in contact with the thin plastic margin. This tendency for plastic flow at the edges of the laminate is greater for thick plastic interlayers than for thin interlayers. Furthermore, the thickness of the outer plies of glass constituting the laminate also determines the tendency of marginal bowing of the glass. Such plastic flow and marginal bowing cause optical distortions through the finished laminated safety glass assembly.

One aspect of my invention is to minimize the tendency for the plastic interlayers to flow unevenly and the outer plies of glass to become bowed. This is accomplished by reinforcing the outer glass plies with relatively thick sheets of a rigid material such as flat glass during the pressing operation. These back up sheets or plates resist bending due to their rigidity, and thus tend to keep the outer plies of the laminate flat and parallel during the laminating process.

Another drawback in the conventional lamination of glass sheets is the tendency for air bubbles to be entrapped within the plastic interlayer, thus spoiling the optical properties of the assembly. I have correlated this air entrapment to an insufficient evacuation of the autoclave pressing bag. According to another aspect of my invention, evacuation of autoclave bags is facilitated by inserting a flexible irregularly surfaced material in the bag to insure an air passage from the inserted assembly to an exhaust valve.

One object of the present invention is to provide an improved method for laminating safety glass assemblies.

Another object of the present invention is to provide an efficient method and apparatus for laminating safety glass assemblies provided with interlayers of uniformly thick plastic which are free from bubbles and other optical defects.

These and other objects in the present invention will become apparent upon study of the following description with reference to the accompanying drawings.

Figure 2:
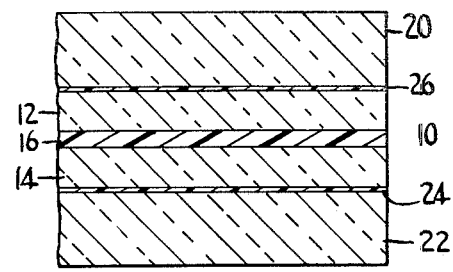
Figure 3:
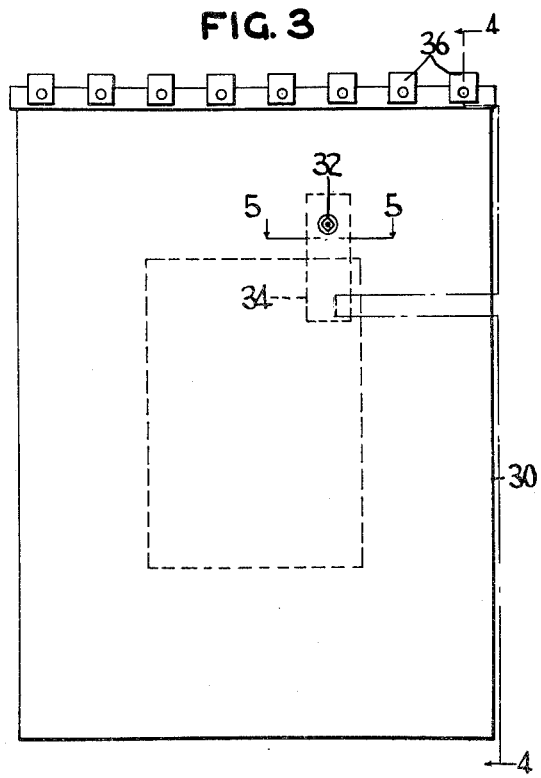
Figure 4:
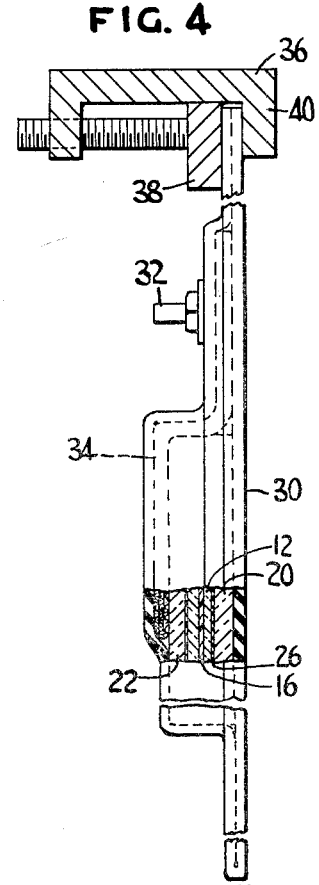
Figure 5:
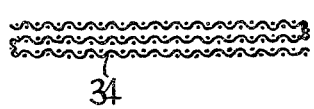

In the drawings:
FIGURE 1 is a cross-sectional view of a portion of a laminated glass assembly produced with the method utilized prior to my present invention;
FIGURE 2 is a cross-sectional view of a laminated assembly ready to be inserted in an autoclave bag according to the teachings of the present invention;
FIGURE 3 is a plan view of a rubber bag improved according to the present invention;
FIGURE 4 is a partial cross-sectional view along the lines 4—4 of FIGURE 3; and
FIGURE 5 is an enlarged cross-sectional view along the lines 5—5 of FIGURE 3.

A laminated assembly 10 produced according to the prior art is seen in FIGURE 1. Such an assembly is provided with a pair of glass sheets 12 and 14 and an interlayer 16 of a sheet of plastic such as polyvinyl butyral. It is noted that at its margin, the plastic interlayer 16 is thinner than elsewhere in the laminate. Also, the pressure in the autoclave has tended to bow the peripheral portions of the glass sheets 12 and 14 toward each other. A safety glass assembly so constituted distorts the optical image of an object viewed therethrough. In addition, the plastic interlayer is characterized by bubbles 18, a source of optical defects.

In FIGURE 2, a safety glass laminate 10 is shown assembled for the autoclave operation according to my invention. The outermost glass sheet 12 is reinforced by a pressing plate 20 and the outermost glass sheet 14 of the laminate is reinforced by a pressing plate 22. Prior to reinforcement, care must be taken to insure that the outermost surfaces of sheets 12 and 14 and the surfaces of pressing plates 20 and 22 are clean, because debris on these surfaces may cause distortion or breakage of the laminate. A thin parting material such as tissue paper or cellophane is used to prevent glass to glass contact between the pressing plates and the outer surfaces of the laminate. Such layers of parting material are shown at 24 and 26 in the drawing.

Where the outer plies of the laminate consist of one thick and one thin plate, it may be necessary to use a pressing plate against the outer surface of the thin ply only, as the thick ply resists deformation and remains substantially parallel to the remainder of the assembly. In laminated units having outer plies made of thin tempered or semi-tempered glass, the use of pressing plates was found to materially improve the optical qualities of the laminate. The tempered plates tend to be warped and bowed from stresses induced in the tempering process. Thick pressing plates tend to flatten the bowed tempered plates and help keep them flat and parallel during the laminating operation.

I have found that a thickness of ¼" polished plate glass is sufficient to prevent warping of cover plates having a thickness up to ⅛". Assemblies having thicker outer plies not exceeding ¼" require pressing plates having a thickness up to ½". A few experiments utilizing ¾" thick pressing plates indicate a very slight improvement over the use of ½" thick pressing plates for laminates having exterior glass sheet thicknesses ranging up to ¼". In general, the results of experiments indicate that the thickness of the pressing plate should preferably be approximately twice that of the adjacent outermost face plate of the laminate to be pressed in order to provide a compromise between the maximum stiffness of reinforcement required to prevent bowing and the minimum bulkiness desired for insertion in the autoclave bag.

Referring to FIGS. 3, 4 and 5, the details of another improvement which forms part of my present invention is disclosed in detail. In laminating a safety glass assembly 10, it is required that the glass-plastic assembly be placed in a flexible container or bag 30, the bag sealed, the air completely removed from the bag and the sealed bag placed in an autoclave where heat and pressure are applied. When vacuum is applied to an opening in the bag through a valve 32, there is a tendency for the flexible bag to seal itself around the valve, thus preventing the air from being evacuated from the interior of the bag surrounding the glass assembly. Air remaining within the bag during autoclaving tends to become entrapped within the plastic interlayer, thus causing air bubbles to develop within the assembly.

In order to insure that all the air within the bag is removed, a flexible irregularly surfaced material such as a woven screen 34, made of a synthetic organic copolymer of vinyl chloride and vinylidene chloride, known commonly as Saran plastic, is inserted within the bag to extend from the area adjacent the laminated assembly to the valve. Saran is an ideal material for this purpose, because it does not tend to mold during the pressing operation, thus enabling it to be used repeatedly. In addition, the plastic screen is soft and pliable and amenable to bending such as shown in FIGURE 5. Thus, it does not cut or protrude through the bag nor exert local stresses on the edge of the laminate with which it comes into contact during the autoclaving operation.

In placing the assembly within the flexible bag, the Saran screen is inserted therewithin in overlapping relation to a margin of the glass-plastic reinforced assembly. The assembly must be placed within the bag in spaced relation to the valve in order to avoid having the valve mar the assembly in the autoclave. Conventional clamping screws 36 are provided to force a bar 38 adjacent a flange 40 of the clamp 36 in order to seal the edge of the autoclave bag after the latter is loaded with the assembly and the screening.

The particular embodiments of the apparatus disclosed herein are for purposes of illustration rather than limitation. For example, the pressing plates, while preferably of thick glass, may also be composed of other rigid materials, such as metallic sheets or rigid ceramic sheets other than glass. Also, the plastic screening 34 may be of a material other than Saran, provided it has sufficient rigidity to provide an air passage between the inserted laminate and the air valve 32, sufficient flexibility to be inserted in bent form, and sufficient softness and chemical durability to refrain from harming the flexible autoclave bag either mechanically or chemically.

While the teachings of the present invention have been described particularly in relation to glass-plastic sandwiches having a single plastic interlayer, it is understood that the present invention is equally adapted for use in preventing the occurrence of optical defects in the fabrication of multiplate assemblies comprising a plurality of plastic interlayers each sandwiched between a pair of glass sheets. In such use, the thickness of each exterior glass plate in the laminate determines the rigidity required for the pressing plates. The interior glass sheets are reinforced by the portions of the laminate exterior thereto, so that the thickness of the interior sheets does not affect the thickness required for the pressing plate. The use of the rigid yet resilient member 34 is also required in multiplate lamination.

This application is a continuation of my application Serial No. 424,852, filed on April 22, 1954, and entitled "Method of Manufacturing Glass-Plastic Laminates," now abandoned.

I claim:

1. A method of producing a laminated assembly comprising at least two sheets of glass and at least one interlayer of plastic material, said assembly having thin exterior bowed tempered glass sheets, comprising applying rigid glass pressing plates having at least about twice the thickness of the thin exterior bowed sheets with flat faces of the plates against the latter, inserting the assembly together with the rigid glass pressing plates in a pliable bag, sealing the bag, evacuating the sealed bag with the pressing plates and the assembly therein, and applying heat and pressure to adhere the plastic interlayer to the adjacent glass sheets.

2. In a method of manufacturing glass-plastic laminates from composite assemblies, each having at least one thin exterior bowed sheet of glass, involving the application of heat and pressure to complete the seal between the intermediate layer of transparent plastic material and a pair of glass sheets at least one of which is a thin exterior bowed sheet of glass for each composite assembly, the improvement comprising placing one flat face of a rigid pressing plate against an exposed surface of each thin exterior bowed sheet of each composite assembly to be laminated, inserting at least one assembly with each exposed surface of each thin exterior bowed sheet abutted by the flat face of a rigid pressing plate within a flexible bag, sealing the bag and evacuating the sealed bag containing the assembly and the rigid pressing plate therein prior to applying heat and pressure to the assembly within the bag.

3. In the method described in claim 2, the improvement wherein each rigid pressing plate is a sheet of glass at least approximately twice the thickness of the thin exterior sheet of the laminated assembly in contact therewith.

No references cited.